United States Patent
Suzuki et al.

(10) Patent No.: US 8,038,914 B2
(45) Date of Patent: Oct. 18, 2011

(54) MOLDED ARTICLE PRODUCTION METHOD AND MOLDED ARTICLE

(75) Inventors: Yoshikazu Suzuki, Toyota (JP); Tomokiyo Suzuki, Susono (JP); Hironao Hayashi, Gifu-ken (JP); Osamu Kuriyagawa, Toyota (JP); Iori Kobayashi, Toyota (JP); Kensuke Nakanishi, Toyota (JP); Toru Takahashi, Obu (JP); Yuki Yamakawa, Aichi-ken (JP); Masanori Sumida, Nagoya (JP)

(73) Assignees: Toyota Jidosha Kabushiki Kaisha, Toyota-shi, Aichi-ken (JP); Matsuo Industries Inc., Obu, Aichi Pref. (JP)

( * ) Notice: Subject to any disclaimer, the term of this patent is extended or adjusted under 35 U.S.C. 154(b) by 637 days.

(21) Appl. No.: 11/592,961

(22) Filed: Nov. 6, 2006

(65) Prior Publication Data

US 2007/0120287 A1  May 31, 2007

(30) Foreign Application Priority Data

Nov. 18, 2005 (JP) ................................. 2005-334112

(51) Int. Cl.
*B29C 45/14* (2006.01)
*B29C 45/16* (2006.01)
*B29C 67/20* (2006.01)

(52) U.S. Cl. .................. 264/46.4; 264/255; 264/259

(58) Field of Classification Search .................. 264/260, 264/239, 259, 46.4, 46.5, 46.6, 255
See application file for complete search history.

(56) References Cited

U.S. PATENT DOCUMENTS

| 4,011,819 | A |   | 3/1977 | Kessler |
| 4,083,902 | A | * | 4/1978 | Clyde ........................... 264/420 |
| 4,947,846 | A | * | 8/1990 | Kitagawa et al. ............. 600/391 |
| 5,008,060 | A | * | 4/1991 | Kanai et al. .................... 264/255 |
| 5,098,801 | A | * | 3/1992 | Boram et al. .................. 429/160 |
| 5,122,858 | A | * | 6/1992 | Mahulikar et al. ............ 257/753 |

(Continued)

FOREIGN PATENT DOCUMENTS

DE  41 25 324  2/1993

(Continued)

OTHER PUBLICATIONS

Notification of Reason(s) for Refusal for JP Appl. No. 2005-334112 dated Aug. 24, 2010.

*Primary Examiner* — Joseph Del Sole
*Assistant Examiner* — Ryan Ochylski
(74) *Attorney, Agent, or Firm* — Finnegan, Henderson, Farabow, Garrett & Dunner, LLP

(57) ABSTRACT

In a method for producing a molded article having a resin part, the resin part is injection-molded to an opening of a main body part and the molded article has an excellent air-tightness between the resin part and the main body part. A foam sealant is attached to a peripheral portion around the opening of the main body part. Attached to the main body part is a retainer made of the same kind of resin as injected resin and adapted to keep the foam sealant compressed in its thickness direction. The main body part is placed within a mold so that the retainer is exposed inside a cavity of the mold. A molten resin is injected into the cavity of the mold. The injected resin and the retainer are integrated into the resin part.

6 Claims, 12 Drawing Sheets

U.S. PATENT DOCUMENTS

| | | | | |
|---|---|---|---|---|
| 5,271,880 A | * | 12/1993 | Lindsay | 264/219 |
| 5,447,446 A | * | 9/1995 | Miller | 439/281 |
| 5,588,856 A | * | 12/1996 | Collins et al. | 439/204 |
| 5,690,881 A | * | 11/1997 | Horie et al. | 264/263 |
| 5,792,407 A | * | 8/1998 | Berzack | 264/229 |
| 6,315,541 B1 | * | 11/2001 | Maeda et al. | 425/127 |
| 6,913,493 B2 | * | 7/2005 | Berg et al. | 439/736 |
| 2002/0004128 A1 | * | 1/2002 | Forte et al. | 428/308.4 |
| 2002/0052140 A1 | * | 5/2002 | Hara et al. | 439/587 |
| 2003/0194896 A1 | * | 10/2003 | Fetcenko et al. | 439/271 |
| 2004/0004816 A1 | * | 1/2004 | Yamaguchi et al. | 361/695 |
| 2004/0017051 A1 | * | 1/2004 | Lach et al. | 277/650 |
| 2004/0018337 A1 | | 1/2004 | Hus et al. | |
| 2005/0095922 A1 | | 5/2005 | Berg et al. | |

FOREIGN PATENT DOCUMENTS

| | | |
|---|---|---|
| FR | 2 646 800 | 11/1990 |
| JP | 9-286038 | 11/1997 |
| JP | A-10-15985 | 1/1998 |
| JP | 10-74560 | 3/1998 |
| JP | 11-38024 | 2/1999 |
| JP | 2001217020 A * | 8/2001 |
| WO | WO 9833241 A1 * | 7/1998 |

\* cited by examiner

MOLDED ARTICLE PRODUCTION METHOD AND MOLDED ARTICLE

INCORPORATION BY REFERENCE

The disclosure of Japanese Patent Application No. 2005-334112 filed on Nov. 18, 2005 including the specification, drawings and abstract is incorporated herein by reference in its entirety.

BACKGROUND OF THE INVENTION

1. Field of the Invention

The present invention relates to a method for producing a molded article in which a resin part is injection-molded to an opening of a main body part. The invention is also directed to a molded article of the type having a resin part injection-molded to an opening of a main body part.

2. Description of the Related Art

A connector case used in, for example, electric components or automobile parts, has a main body made of metal or the like and a cable connecting part that is frequently molded from a resin. Such a connector case is produced by molding the connecting part in such a way that the resin is injection-molded to an opening provided on the main body part. Apart from the connector case exemplified above, widespread use is made of a method for molding a resin part by injection-molding a resin to an opening of a main body part.

In order to prevent water or the like from entering the main body part, the junction area (hereinbelow, often referred to as a "surface boundary") between the main body part and the resin part must be airtight. Conventionally, to achieve the required air-tightness, a sealant such as an O-ring or the like is first adhesively attached to the peripheral portion around the opening of the main body part, after which the resin part is injection-molded. However, since conventionally used sealants such as the O-ring exhibit high repulsion and low compressibility, it is impossible to perform the injection molding of the resin part with the sealants sufficiently compressed. Thus, due to the shrinkage occurring during cooling and solidification of the molten resin, a gap may be created at the surface boundary between the resin part and the sealant or between the sealant and the main body part, thus detrimentally affecting the air-tightness between the resin part and the main body part.

Japanese Patent Application Publication No. JP-A-10-15985 describes a technique for injection-molding a resin part to a main body part, wherein a thermally expandable material is attached beforehand around the target portion of the main body part to which the resin part is to be injection-molded, so that the air-tightness is attained between the main body part and the resin part due to the expansion of the thermally expanded material by the heat of the molten resin during the injection molding.

In the described technique, the sealant containing a thermally expandable material is secured around the target portion of the main body part to which the resin part is to be injection-molded. The main body part is placed within a mold and, subsequently, the hot molten resin is injection-molded into the mold. The heat of the molten resin causes the thermally expandable material to expand.

The expansion of the thermally expandable material fills minute gaps existing between the main body part and the resin part, thereby assuring an increased air-tightness. Even if the molten resin is cooled down and shrinks, the sealant expands proportional to the shrinkage, thus providing an advantage in ensuring the required air-tightness at the surface boundary between the main body part and the resin part.

However, in the described technique, the expansion of the thermally expandable material may sometimes be insufficiently in the case where the thermally expandable sealant is attached around the target portion of the main body part to which the resin part is to be injection-molded and then the thermally expandable sealant is expanded by the heat of the molten resin in the injection molding process. For example, if the resin part to be molded has a relatively small volume, the molten resin may fail to carry enough heat to sufficiently expand the sealant. Insufficient expansion of the sealant makes it impossible to attain the required air-tightness.

To resolve this problem, Japanese Patent Application Publication No. JP-A-10-15985 suggests reheating the molded article after the injection molding process, which allows the sealant to expand after the molding process of the resin part is completed, thereby ensuring the required air-tightness. However, this technique requires an additional processing step of reheating the molded article.

Demand exists for an injection molding technique that ensures the required air-tightness at the surface boundary between the main body part and the resin part without requiring an additional step of, e.g., reheating the molded article.

SUMMARY OF THE INVENTION

The present invention provides the required level of air-tightness by using an expanded foam sealant instead of expanding the sealant by using the heat of injected molten resin as in the technique disclosed in Japanese Patent Application Publication No. JP-A-10-15985. In accordance with the present invention, the foam sealant is compressed before or during the injection molding process. No insufficient expanding of the foam sealant occurs in the present invention. If injection molding is conducted when the foam sealant is compressed before or during the injection molding process, the compressed sealant is restored to compensate the shrinkage of the molten resin, which may occur in the solidification of the latter. The foam sealant remains compressed even if the molten resin shrinks during its solidification. Accordingly, it is possible to ensure an increased air-tightness by placing the compressed foam sealant between the solidified resin (resin part) and the main body part.

In accordance with the present invention, it is possible to positively assure the air-tightness at the surface boundary between the main body part and the resin part without any additional processing, e.g., reheating the molded article. Therefore, there is no need for a step for making sure the air-tightness maintained at the surface boundary after the resin part has been injection-molded. This makes it possible to cost-effectively provide a molded article in which the resin part is injection-molded to the main body part, while ensuring the air-tightness at the surface boundary between the main body part and the resin part.

One aspect of the present invention provides a method for producing a molded article in which a resin part is injection-molded in an opening of a main body part. This method includes the steps of: attaching a foam sealant to a peripheral portion around the opening of the main body part; attaching a retainer to the main body part so that the retainer clamps together the foam sealant, attached to the main body part, and the peripheral portion around the opening of the main body part in the thickness direction of the foam sealant to keep the foam sealant compressed in the thickness direction; defining a cavity by combining the main body part with a mold so that the retainer attached to the main body part is exposed inside the cavity; and injecting a molten resin into the cavity.

Preferably, the retainer is made of the same kind of resin as the injected resin.

As used herein, the term "foam sealant" means a sealant having a multiplicity of isolated or semi-isolated pores in the interior thereof and exhibiting no air permeability. The term "thickness direction" refers to a direction extending in a height direction of the foam sealant from a attachment surface.

The retainer has, e.g., a generally U-shaped cross section with parallel flange portions and is adapted to, by the parallel flange portions, clamp together the foam sealant and the peripheral portion around the opening of the main body part. In other words, the retainer has a clip shape that can clamp together the foam sealant and the peripheral portion around the opening of the main body part. The retainer may be of a type capable of keeping the foam sealant attached around the opening compressed over the entire or partial portion thereof.

In accordance with the method noted above, the foam sealant is attached to the peripheral portion around the opening of the main body part prior to the injection of the molten resin into the cavity. Subsequently, the retainer for keeping the foam sealant attached to the main body part compressed in the thickness direction is attached to the main body part. Use of the retainer that clamps together the foam sealant and the main body part in the thickness direction of the foam sealant to keep the foam sealant in the thickness direction makes it possible to inject the molten resin under the condition that the foam sealant is sufficiently compressed. The retainer is made of the same kind of resin as the injected molten resin and therefore can become one with the injected molten resin, thus ensuring a high level of air-tightness between the retainer and the injected molten resin. Seeing that the foam sealant is sufficiently compressed prior to the resin injection, the compressed foam sealant is restored to compensate the shrinkage of the molten resin which may occur during the solidification of the latter. This ensures the required level of air-tightness.

The present invention may also be embodied by a method of compressing the foam sealant by using a compression member provided in the mold and then injection molding the resin, instead of compressing the foam sealant with a retainer.

This method includes the steps of: attaching a foam sealant to a peripheral portion around the opening of the main body part; defining a cavity by combining the main body part with a mold so that the foam sealant attached to the main body part and the peripheral portion around the opening of the main body part are exposed inside the cavity; pushing a compression member movable with respect to the mold against the foam sealant in a thickness direction of the foam sealant to thereby keep the foam sealant compressed; and injecting a molten resin into the cavity and separating the compression member from the foam sealant prior to solidification of the injected molten resin.

In accordance with the above-described method, the foam sealant attached to the peripheral portion around the opening of the main body part is kept compressed by means of the compression member. This makes it possible to maintain the foam sealant in a sufficiently compressed condition. Under this condition, the molten resin is injected into the cavity. The compression member is separated from the foam sealant before the injected molten resin solidifies. As the compression member is separated before the injected resin solidifies, the resin not yet solidified flows into the space previously occupied by the compression member. Although the foam sealant expands in response to the separation of the compression member, the expansion of the foam sealant remains small because the molten resin maintains the pressure on the foam sealant. As a result, even if the compression member is separated from the foam sealant before the injected molten resin has completely solidified, the injection-molding operation can be performed under the condition that the foam sealant is kept compressed.

It is preferred that, in the foam sealant attaching step, the foam sealant is attached to an external surface of the peripheral portion around the opening of the main body part and further, in the cavity defining step, the cavity is defined by combining the main body part with the mold so that an internal surface of the peripheral portion around the opening of the main body part can be exposed inside the cavity.

Inasmuch as the internal surface of the peripheral portion around the opening of the main body part is exposed inside the cavity, the molten resin flowing through the opening fills into the cavity on the external surface side of the foam sealant and the cavity on the internal surface side of the main body part. The resin part thus injection-molded extends through the opening and comes into a pressure-contact with the external surface of the foam sealant and the internal surface of the main body part, thereby maintaining the foam sealant in a compressed condition.

The present invention may also be embodied by a method of allowing a foam sealant to be compressed by the pressure of an injected resin, instead of compressing the foam sealant before the injection of the resin. This method includes the steps of: attaching a foam sealant to an external surface of a peripheral portion around the opening of the main body part; defining a cavity by combining the main body part with a mold in such a manner that the foam sealant attached to the main body part and an internal surface of the peripheral portion around the opening of the main body part are exposed inside the cavity; and injecting a molten resin into the cavity while compressing the foam sealant by means of a pressure of the injected molten resin.

The step of attaching the foam sealant to the main body part may be conducted either before combining the main body with the mold or subsequent to disposing the main body part within the opened mold.

In the method noted above, the foam sealant whose foaming has been completed is attached to the surface of the peripheral portion around the opening of the main body part prior to injecting the molten resin into the cavity. Then, the foam sealant is compressed by the pressure of the molten resin. In accordance with this method, there is no need to use a retainer for keeping the foam sealant compressed in its thickness direction or a compression member movable within the cavity. Removal of these elements in compressing the foam sealant makes it quite easy to perform the process of producing a molded article. The resin part thus injection-molded extends through the opening and comes into a pressure-contact with the external surface of the foam sealant and the internal surface of the main body part, thus maintaining the foam sealant in a compressed condition.

In the foam-sealant attaching step, the foam sealant may be either attached along a raised rim portion provided around the opening of the main body part or attached to a groove portion provided around the opening of the main body part. In the former case, the foam sealant may be attached to a wall surface of the raised rim portion extending upwardly from the surface of the peripheral portion around the opening of the main body part. Furthermore, the foam sealant may be attached in such a manner as to go over the raised rim portion. In the latter case, the groove portion may have a cross section of rectangular or sector-like shape. Moreover, the foam sealant may be partially disposed in the groove portion. In either case, it is possible to reduce dislocation of the foam sealant off its original attachment surface at the time of resin injection.

Further, it is preferred that the foam-sealant attaching step includes applying a liquid or powdery sealant containing an expandable substance to the peripheral portion around the opening of the main body part and foaming the expandable substance contained in the sealant applied.

The step of applying the liquid or powdery sealant containing an expandable substance is more suitable for automation than the step of attaching a sheet-like foam sealant, which is pre-cut in conformity with the shape of the peripheral portion of the opening, to the peripheral portion of the opening. Thus, a molded article ensuring an excellent air-tightness between the resin part and the main body part can be produced by means of an automated production method.

In accordance with another aspect of the present invention, there is provided a molded article including: a main body part having an opening; a resin part injection-molded to the opening of the main body part; and a foam sealant attached to an external surface of a peripheral portion around the opening of the main body part, wherein the injection-molded resin part extends through the opening and comes into a contact, at the external surface side of the main body part, with an external surface of the foam sealant and, at an internal surface side of the main body part, with an internal surface of the main body part, wherein the foam sealant is interposed between the resin part and the main body part, and wherein the resin part compresses the foam sealant in a thickness direction at a compression ratio of 5%-90%.

In the molded article described above, the foam sealant compressed at a compression ratio of 5%-90% is interposed between the main body part and the resin part, thereby ensuring the air-tightness at the surface boundary of the main body part and the resin part. The injection-molded resin part extends through the opening to come into a pressure-contact with the external surface of the foam sealant and with the internal surface of the main body part. In other words, the foam sealants, which are respectively attached on the internal and the external surface of the main body part, are pressurized by the resin part and therefore can be kept compressed for an extended period of time.

In accordance with the present invention, a molded article capable of ensuring the air-tightness at the surface boundary between the main body part and the resin part at the time of solidification of the injected molten resin can be produced without requiring an additional step for making sure the air-tightness at the surface boundary after the resin part has been injection-molded to the main body part.

The methods in accordance with the present invention require no additional step for ensuring the air-tightness at the surface boundary after the injection-molding of the resin part. This makes it possible to cost-effectively provide a molded article in which the resin part is injection-molded to the opening of the main body part, while positively ensuring the air-tightness at the surface boundary between the main body part and the resin part.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

The major features of a foam sealant employed in the present invention are described below.

1. The foam sealant is preferably a type that is capable of maintaining air-tightness at a compression ratio of equal to or greater than 5%. If the compression ratio is about 5%, the required compression ratio can be readily attained even if an injected molten resin has shrunk during solidification.

2. It is preferred that the foam sealant has a compression stress of equal to or smaller than $1.0 \times 10^{-4}$ N/m$^2$ at a strain of 50%, when measured by using a method in conformity with JISK6767 (Japanese Industrial Standards K 6767). If the compression stress at the strain of 50% is equal to or smaller than $1.0 \times 10^{-4}$ N/m$^2$, the foam sealant may be sufficiently compressed even though the molten resin is injected at a low pressure.

3. It is preferred that the foam sealant can maintain the required air-tightness at a low compression ratio (about 5%), and can be compressed with a low stress (namely, compressed to a compression ratio of 50% or more (reduced in thickness by 50% or more) with a stress of equal to or smaller than $1.0 \times 10^{-4}$ N/m² ) while exhibiting a small variation of stress for a large change of strain. An example of a suitable foam sealant is "EPT sealer"®, manufactured by Nitto Denko Corporation.

First Embodiment

Figure 1A:
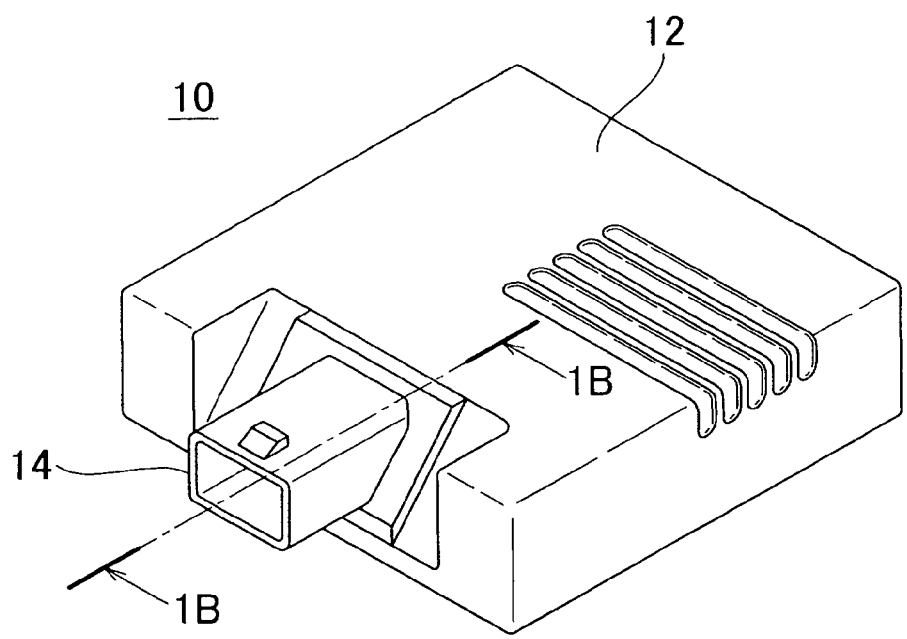
FIG. 1A is a schematic perspective view showing a connector case produced by using a method in accordance with a first embodiment of the present invention.
Figure 1B:
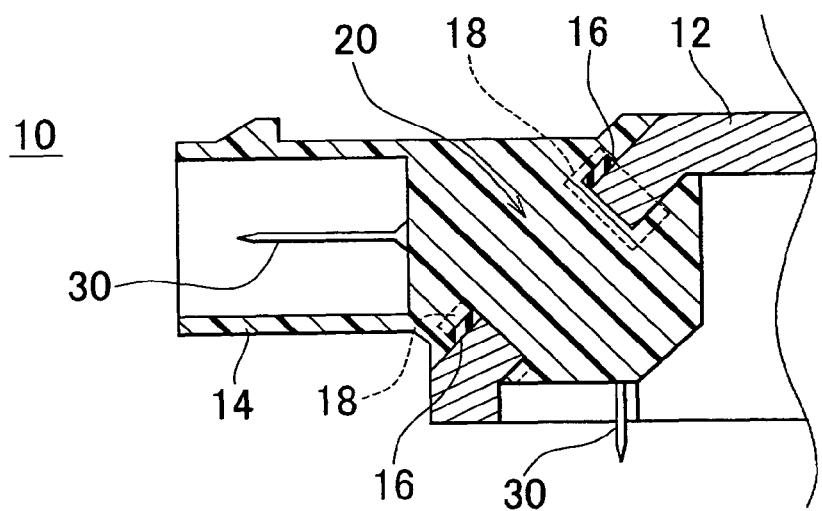
FIG. 1B is an enlarged vertical cross-sectional view taken along line 1B-1B in FIG. 1A to illustrate the surroundings of an opening.
Figure 1C:
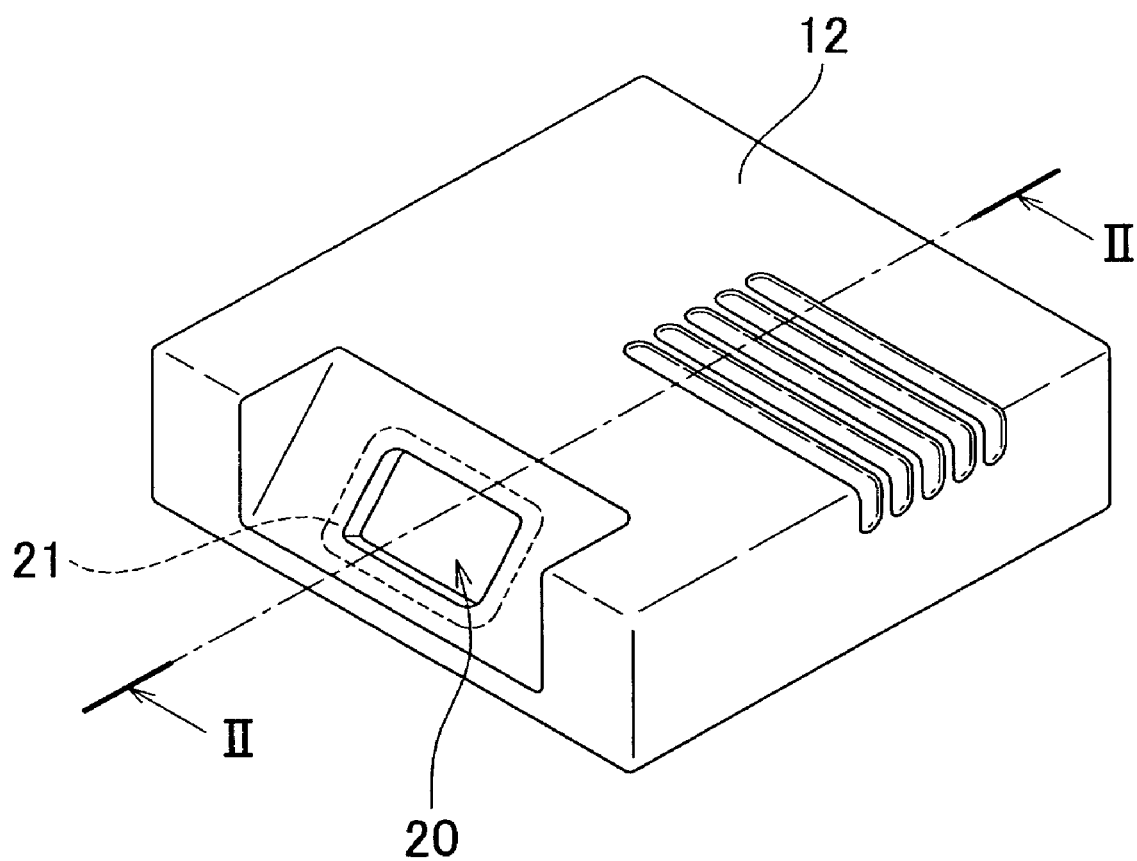
FIG. 1C is a schematic perspective view depicting a main body part.

Referring now to FIGS. 1A-1C, general description will be given to a connector case (molded article) 10 produced by using a method in accordance with a first embodiment of the present invention.

FIG. 1A is a schematic perspective view showing a connector case 10 produced by using the method in accordance with the first embodiment of the present invention, FIG. 1B is an enlarged vertical cross-sectional view taken along line 1B-1B in FIG. 1A to illustrate the surroundings of a connector part 14, and FIG. 1C is a schematic perspective view depicting a main body part 12 of the connector case 10. The first embodiment is directed to a method for producing a connector case 10 in which a resin-made connector part (resin part) 14 is molded in an opening 20 of a metallic main body part 12 by using an injection molding process.

As shown in FIG. 1A, the resin-made connector part 14 is molded onto the main body part 12 through an injection molding process. As is apparent in FIGS. 1A and 1C, the connector part 14 is formed to block the opening 20 provided in the main body part 12.

As depicted in FIG. 1B, a foam sealant 16 is attached to an external surface of a peripheral portion (peripheral portion 21 shown in FIG. 1C) around the opening 20 of the main body part 12. The connector part 14 is formed by injection-molding a resin. A retainer 18 indicated by broken lines serves to keep the foam sealant 16 compressed in its thickness direction prior to injection-molding the connector part 14. As used herein, the term "thickness direction" refers to a direction extending from the sealant attachment surface in a height direction of the foam sealant.

The retainer 18 is preferably formed with the same kind of resin as that of the injection-molded connector part 14. Thus, the retainer 18 becomes integrated with the injected molten resin to form a part of the connector part 14. It should be noted that the retainer 18 may be formed with any kind of resin as long as it can be integrated with the injected molten resin to form a part of the connector part 14.

Extending through the connector part 14 is a metallic terminal 30 that functions to electrically interconnect an electrical component disposed within the main body part 12 and a cable of other connectors (not shown) coupled to the connector part 14.

Taking into account the fact that electrical components are arranged within the connector case 10, the junction area between the main body part 12 and the connector part 14 should be made air-tight. The foam sealant 16 serves to ensure the air-tightness.

The foam sealant 16 is a sealant of high compressibility because it has previously been expanded. As used herein, the term "high compressibility" means that the stress required in compressing the foam sealant is low. The foam sealant is of a type having characteristics that its compression ratio is not proportional to a compression stress and a high compression ratio can be obtained with a stress value smaller than that corresponding to the compression ratio. In other words, the foam sealant exhibits a narrow variation in stress in presence of a wide variation in strain. More specifically, it is preferred that the foam sealant 16 has a compression stress of equal to or smaller than $1.0 \times 10^{-4}$ N/m² at a strain of 50%, in its compression stress-strain characteristic measured by using a method in conformity with JISK6767. This is because, if the compression stress at a strain of 50% is equal to or smaller than $1.0 \times 10^{-4}$ N/m², the foam sealant 16 can easily be compressed.

Figure 2:
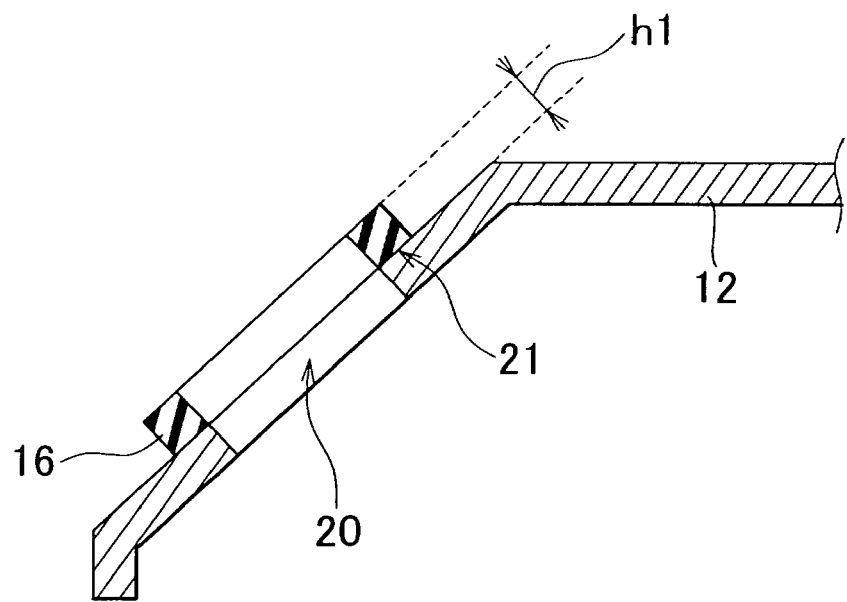
FIG. 2 is a cross-sectional view taken along the line II-II in FIG. 1C and showing a state in which a foam sealant is attached to the main body part
Figure 3:
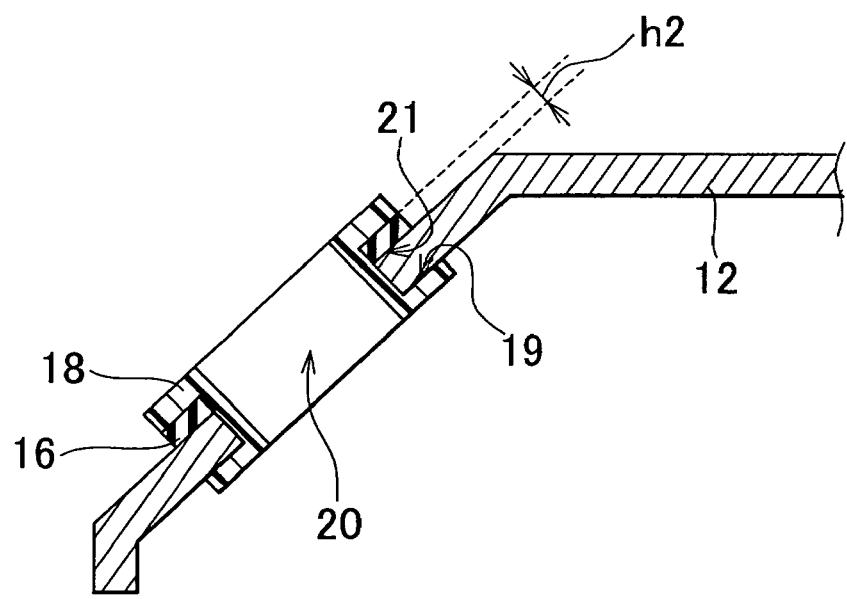
FIG. 3 is a view showing a state in which a retainer is attached to the main body part.

Next, a process for producing the connector case 10 will be described with reference to FIGS. 2 through 8. FIG. 2 is a view showing a step of attaching the foam sealant 16 to the external surface of the peripheral portion 21 around the opening 20 of the main body part 12. FIG. 3 is a view illustrating a step of attaching the retainer 18 to the main body part 12 to keep the foam sealant 16 compressed in its thickness direction.

FIGS. 2 and 3 are enlarged vertical cross-sectional views taken along line II-II in FIG. 1C and showing the surroundings of the opening 20, in which those portions of the main body part 12 located more rearward than the paper plane are omitted from illustration.

Referring to FIG. 2, the foam sealant 16 is attached to the external surface of the peripheral portion 21 around the opening 20 of the main body part 12. The foam sealant 16 has a thickness of h1 in a load-free condition.

Subsequently, as illustrated in FIG. 3, the retainer 18 is attached to the main body part 12. The retainer 18 is formed of the same kind of resin as the resin part that is injection-molded later.

The retainer 18 has a generally U-shaped cross section and keeps the foam sealant 16 compressed in its thickness direction by clamping together the foam sealant 16 attached to the main body part 12 and the peripheral portion 21 around the opening 20 of the main body part 12 one above the other in the thickness direction of the foam sealant 16. To be more specific, the retainer 18 is insertedly fitted through the opening 20 and comes in contact, at one end, with the surface of the foam sealant 16 attached to the main body part 12 and, at the other end, with the internal surface 19 of the peripheral portion 21 around the opening 20 of the main body part 12, thereby maintaining the foam sealant 16 compressed in the thickness direction. As can be seen in FIG. 3, the retainer 18 compresses the foam sealant 16 to a thickness of h2. In this respect, the value of h2 is smaller than the value of h1.

Referring to FIG. 3, the retainer 18 is adapted to keep the foam sealant 16 compressed in the thickness direction over the entire circumference of the opening 20. Alternatively, the retainer 18 may be configured to compress the foam sealant 16 cin the thickness direction over at least a part of, preferably, one half of, the circumference of the opening 20. Furthermore, a plurality of retainers 18 may be used, in which case individual retainers may be disposed to, for example, compressingly clamp the foam sealant 16 on the four sides of the rectangular opening.

Next, steps for producing the connector case 10, which are to be carried out after the retainer 18 has been attached in place, will be described with reference to FIGS. 4 through 8. Shown in FIGS. 4 through 8 are vertical cross-sectional views taken along line II-II in FIG. 1C to illustrate the layout of components of the main body part 12 and a mold including a bottom mold 22, a top mold 24 and a slide mold 26.

Figure 4:
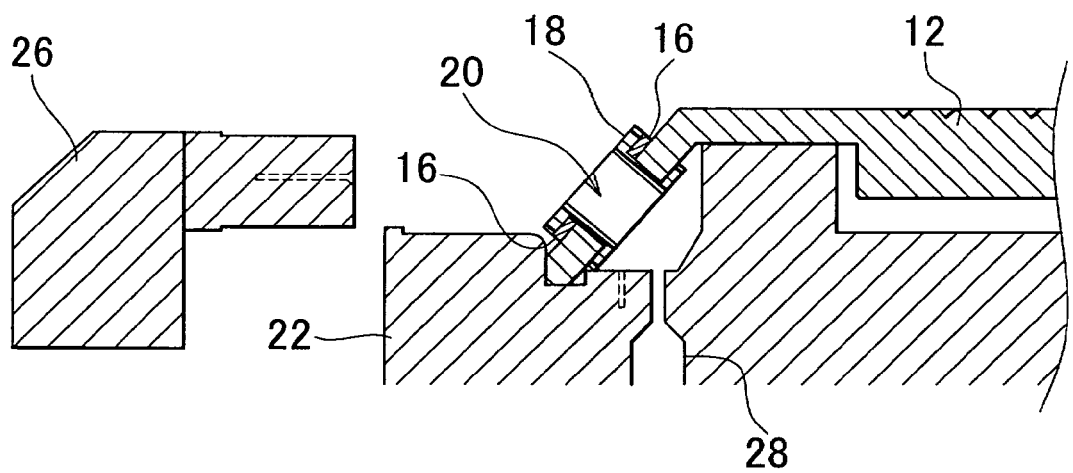
FIG. 4 is a view showing a state in which the main body part is disposed on a bottom mold.

FIG. 4 shows the main body part 12 to which the retainer 18 for keeping the foam sealant 16 in a compressed condition is attached, i.e., the main body part 12 of the state illustrated in FIG. 3, is disposed in the bottom mold 22. Also shown in FIG. 4 are the top mold 24 and the slide mold 26. When the main body part 12 is placed in the bottom mold 22, the top mold 24 and the slide mold 26 are kept in positions spaced apart from the bottom mold 22. The bottom mold 22 is provided with a resin injection passage 28.

Figure 5:
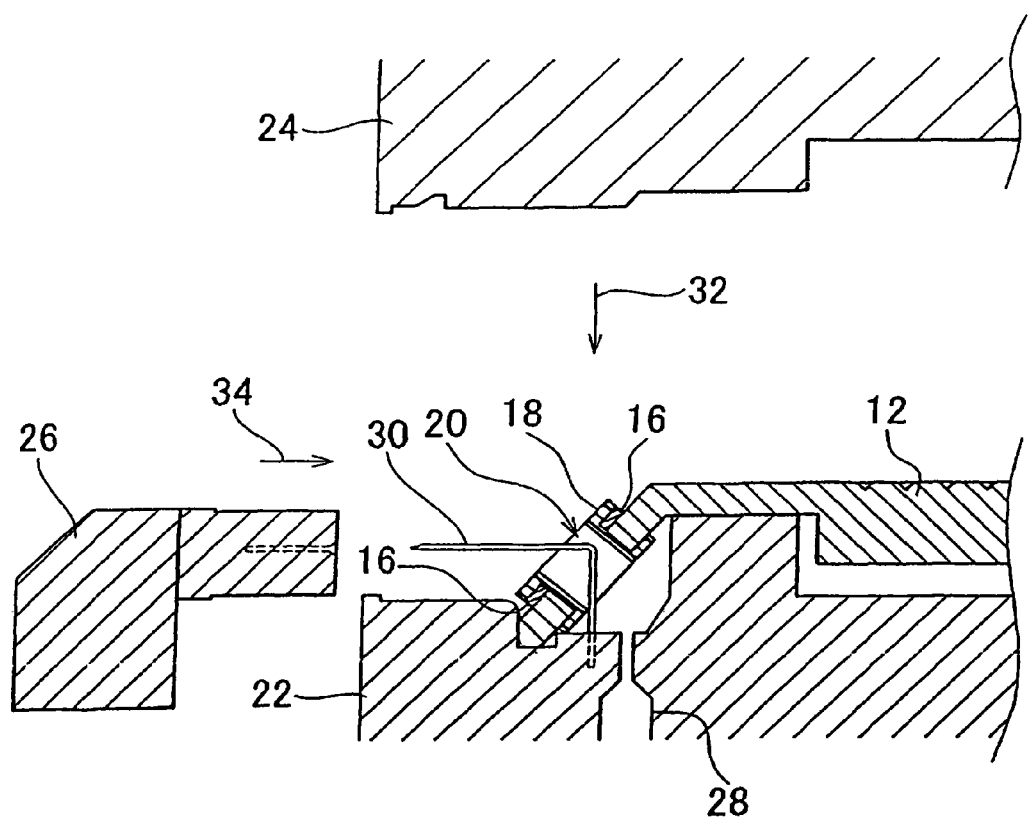
FIG. 5 is a view showing a state in which a metallic terminal is set in the bottom mold.

FIG. 5 shows the state in which a metallic terminal 30 is set in the bottom mold 22. The metallic terminal 30 is inserted through the opening 20 and extends through the main body part 12. In this state, the top mold 24 descends in the direction indicated by the arrow 32 and the slide mold 26 is moved in the direction indicated by the arrow 34 (in the right direction in FIG. 5).

Figure 6:
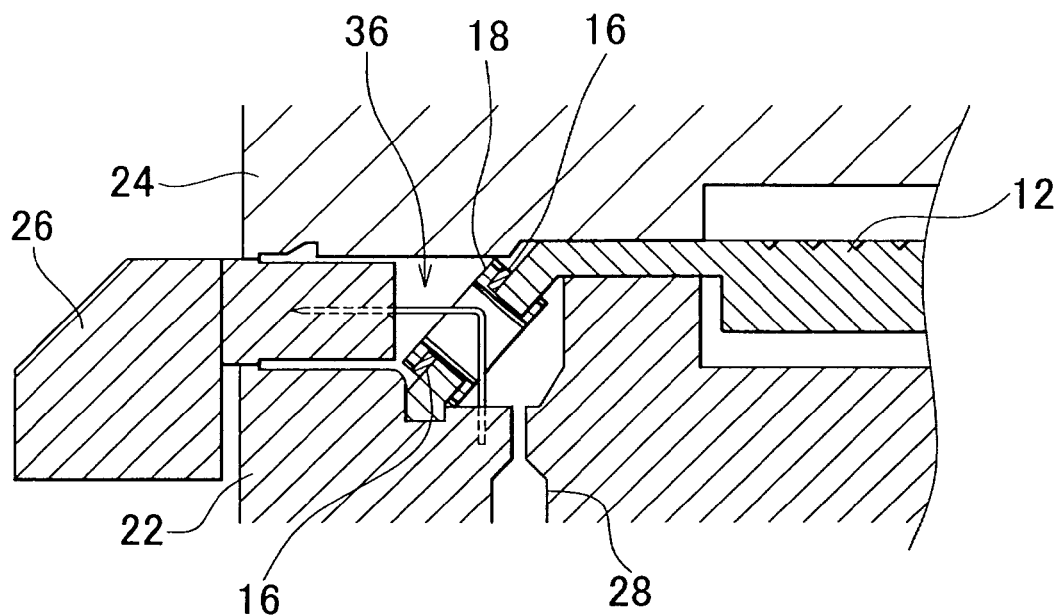
FIG. 6 is a view showing a state in which a mold is closed.

The mold is closed as the top mold 24 is lowered and the slide mold 26 is moved to the right. FIG. 6 illustrates the mold when it is closed. When the mold is closed, the top mold 24, the bottom mold 22, the slide mold 26 and a portion of the main body part 12 together to define a cavity 36 as illustrated in FIG. 6. The main body part 12 is positioned within the mold in such a manner that, as depicted in FIG. 6, the retainer 18 attached to the main body part 12 is exposed inside the cavity 36. Moreover, the main body part 12 is located within the mold such that the internal surface (the surface designated by reference numeral 19 in FIG. 3) of the peripheral portion 21 around the opening 20 of the main body part 12 is exposed inside the cavity 36.

Figure 7:
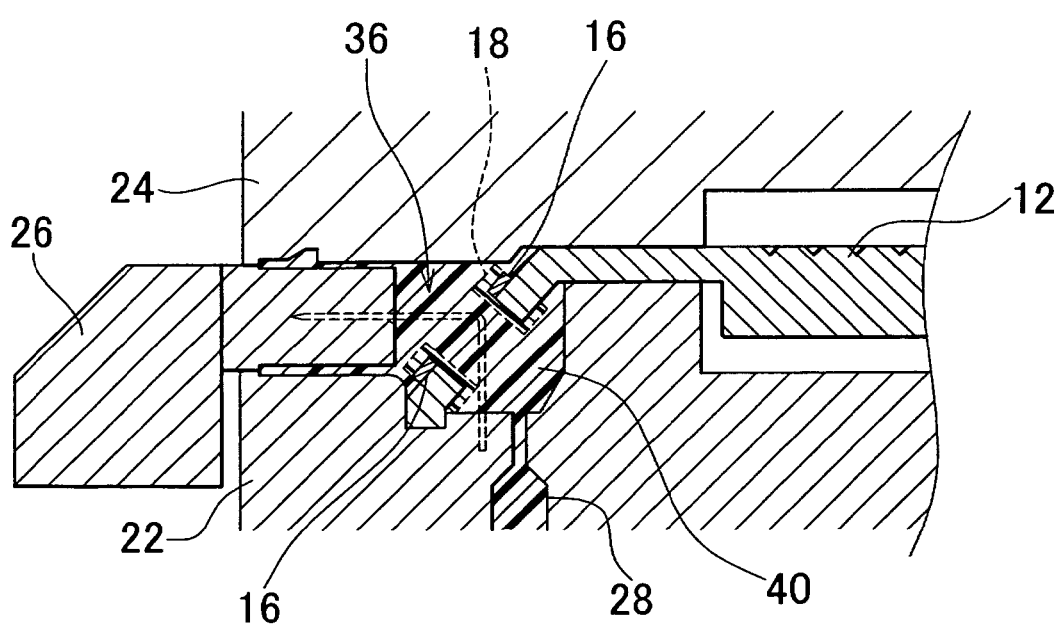
FIG. 7 is a view showing a state in which resin is injected into a cavity defined by the mold.

The thermally molten resin is injected through the injection passage 28 after the mold is closed. FIG. 7 illustrates the cavity 36 when it is filled with the molten resin 40. The retainer 18 is made of the same kind of resin as the resin injected through the injection passage 28 and therefore the surface of the retainer 18 is melted by the heat of the molten resin 40 and becomes one with the molten resin 40 filled in the cavity 36. The condition is kept until the molten resin 40 is cooled down and becomes solidified. The foam sealant 16 is firmly compressed by the retainer 18 to seal the surface boundary between the main body part 12 and the molten resin 40.

Figure 8:
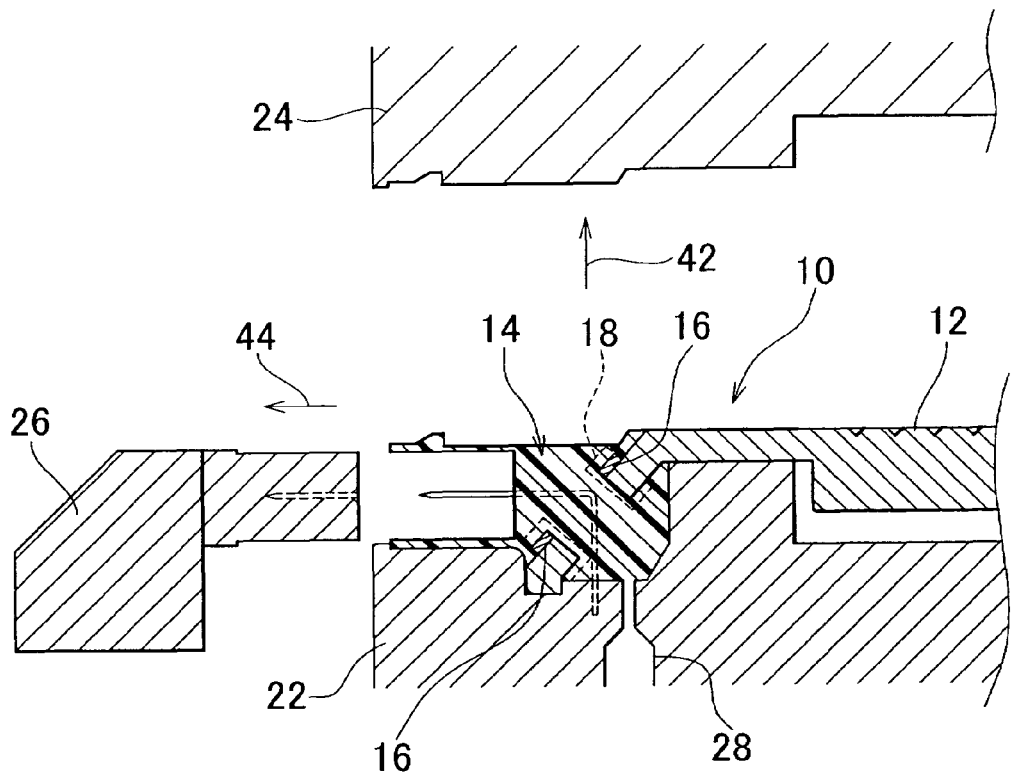
FIG. 8 is a view showing a state in which the mold is opened.

Once the resin has cooled and solidified, the top mold 24 is removed as indicated by an arrow 42 in FIG. 8 and the slide mold 26 is moved to the left as indicated by the arrow 44, thus opening the mold. This yields a connector case 10 in which the resin-made connector part (resin part) 14 is integrally molded with the main body part 12. In FIGS. 7 and 8, the same resin part is designated by different reference numerals 14 and 40 and hatched in different directions in an effort to make clear that FIG. 7 shows the cavity 36 filled with the molten resin 40, while FIG. 8 illustrates the cavity 36 after the molten resin 40 has solidified to form the resin part 14. This numbering convention will also apply in other figures. More specifically, the molten resin 40 is hatched with alternate thick and thin oblique lines running leftward and downward in FIGS. 7, 10 and 11. In contrast, the connector part (resin part) 14 formed through solidification of the molten resin 40 is hatched with alternate thick and thin oblique lines running rightward and downward in FIGS. 1B, 8, 12D and 13D. Because the retainer 18 is a component molded using the same kind of resin as the connector part 14, alternate thick and thin oblique lines running rightward and downward are used to hatch the retainer 18 as can be seen in FIGS. 1B and 8. Inasmuch as the retainer 18 is united with the connector part 14 in FIGS. 1B and 8, the connector part 14 and the retainer 18 are all hatched with the same kind of alternate thick and thin oblique lines running rightward and downward.

According to the first embodiment as set forth above, the molten resin is injected while the foam sealant 16 is compressed in the thickness direction. Since the retainer 18 is formed from the same resin as the injected molten resin, it becomes one with the molten resin to thereby form a part of the connector part (resin part) 14. This provides an air-tight seal between the retainer 18 and the injected resin.

Even if the molten resin shrinks during cooling and further that, in response to such shrinkage, the retainer 18 integrally molded is tensioned away from the surface of the foam sealant 16, the compressed foam sealant 16 expands to maintain the air-tightness between the retainer 18 (namely, the resin-made connector part 14) and the main body part 12.

As described in the foregoing, according to the molded article production method of the first embodiment, the foam sealant 16 is constantly kept compressed in the thickness direction by the retainer 18, allowing the required air-tightness to be secured between the resin-made connector part (resin part) 14 and the main body part 12 even though resin is injection-molded with respect to the main body part 12. This makes it possible to produce the connector case (molded article) 10 with the required air-tightness sustained between the resin-made connector part (resin part) 14 and the main body part 12 without performing an additional step to ensure the air-tightness between the connector part 14 and the main body part 12, after the resin has been injection-molded.

In the first embodiment, the main body part 12 is located within the mold such that the internal surface 19 of the peripheral portion 21 around the opening 20 of the main body part 12 is exposed inside the cavity 36. Thus, the molten resin flowing through the opening 20 is filled into the cavity on the external surface side of the foam sealant 16 and the cavity on the internal surface side of the main body part 12. The resin part 14 thus injection-molded extends through the opening 20 and comes into a pressure-contact with the external surface of the foam sealant 16 and the internal surface of the main body part 12. By allowing the injection-molded resin part 14 to come into the pressure contact with both the external surface of the foam sealant 16 and the internal surface (the surface designated by the reference numeral 19 in FIG. 3) of the main body part 12 in this manner, it becomes possible to maintain the foam sealant 16 in a compressed condition for an extended period of time.

Alternatively, when a plurality of retainers may be used to compress the foam sealant 16 at several discrete sections, instead of compressing the entire circumference of the foam sealant 16 with a single retainer 18. In this case, the plurality of retainers for compressing the different sections of the foam sealant 16 around the opening 20 serve to prevent the foam sealant 16 from being dislocated from its original position. This ensures that the surface areas of the foam sealant 16 left out of contact with the plurality of retainers are sufficiently compressed between the molten resin and the main body part 12 in the thickness direction by the pressure of the injected molten resin, with no likelihood of dislocation from the originally attached position. If the molten resin shrinks while it is solidifying, the compressed foam sealant 16 expands to fill up the resulting gap, which makes it possible to assure the air-tightness.

The molded article production method of the first embodiment includes the step whereby the retainer 18 for keeping the foam sealant 16 compressed in the thickness direction is attached to the main body part 12 before injection molding of the resin. If the retainer 18 is designed to have a shape capable of keeping the foam sealant 16 compressed over the entire circumference thereof, it is possible to uniformly compress the foam sealant 16, attached around the periphery the opening 20 of the main body part 12, in its thickness direction. In the meantime, if the retainer 18 is divided into a plurality of individual retainers capable of keeping the foam sealant 16 compressed at plural sections of the circumference thereof, it is possible for the respective retainers to prevent the foam sealant 16 from being dislocated on the sealant attachment surface when the foam sealant 16 is compressed by the pressure of the injected resin. This allows the foam sealant to be kept compressed in between the molten resin and the main body part. In either case, the required air-tightness can be secured at the surface boundary between the resin part and the main body part.

In the first embodiment described above, the retainer 18 has a generally U-shaped cross section. The retainer 18 compresses the foam sealant 16 in its thickness direction by clamping the foam sealant 16, attached to the peripheral surface around the opening 20 of the main body part 12, and the main body part 12 together, one above the other, in the thickness direction of the foam sealant 16. The foam sealant 16 can be kept compressed in a reliable manner by designing the retainer 18 so as to clamp together the foam sealant 16 and the main body part 12.

The retainer 18 is able to restrain the external surface and the inner circumferential surface of the foam sealant 16. As an alternative, the retainer 18 may have a shape capable of restraining the outer circumferential surface of the foam sealant 16, as well as the external surface and the inner circumferential surface thereof. In other words, the retainer 18 may be formed such that, when viewed in cross-section, the foam sealant 16 can be completely enclosed by the retainer 18 and the external surface of the main body part 12 to which the foam sealant 16 is attached. This makes it possible to efficiently compress the foam sealant 16 only in its thickness direction with no likelihood of dislocation on the sealant attachment surface. Compressing the foam sealant 16 only in its thickness direction further enhances the air-tightness between the resin-made connector part 14 and the main body part 12.

Furthermore, the retainer 18 may have a shape adapted to clamp a thickness-reduced portion of the peripheral portion 21 around the opening 20 of the main body part 12 and the foam sealant 16 attached to the main body part 12, in its thickness direction. Specifically, for example, one or more lengthwise grooves are provided on the inner surface and/or the outer surface of the main body part 12 around the foam sealant 16 and one or more crosswise grooves are formed on the bottom of each of the lengthwise grooves. Then, the retainer 18 is pressed against the surface of the foam sealant 16 at one end and is hooked on the crosswise groove at the other end, allowing the retainer 18 to be latched to the main body part 12.

Second Embodiment

Figure 9:
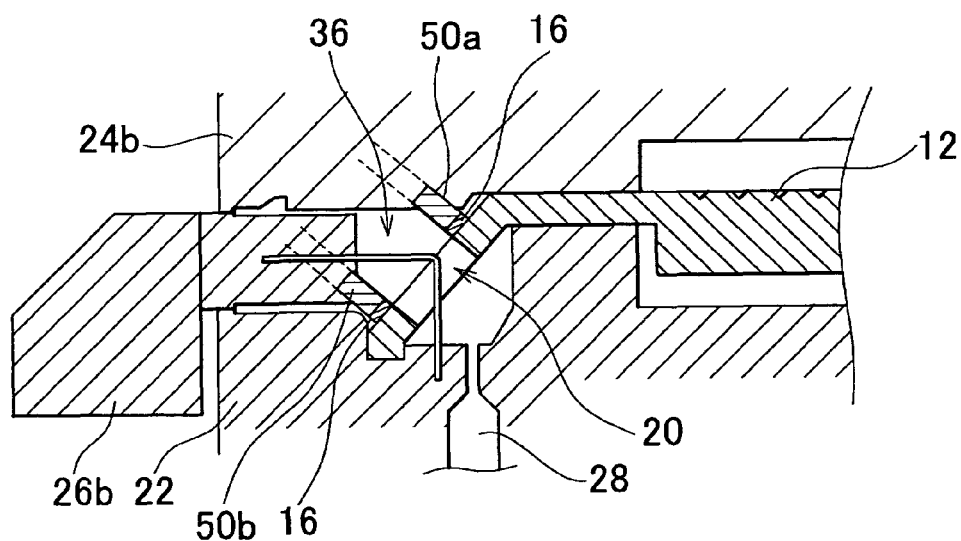
FIG. 9 is a view for explaining a step of a second embodiment of the present invention, which corresponds to the step of the first embodiment shown in FIG. 6.
Figure 10:
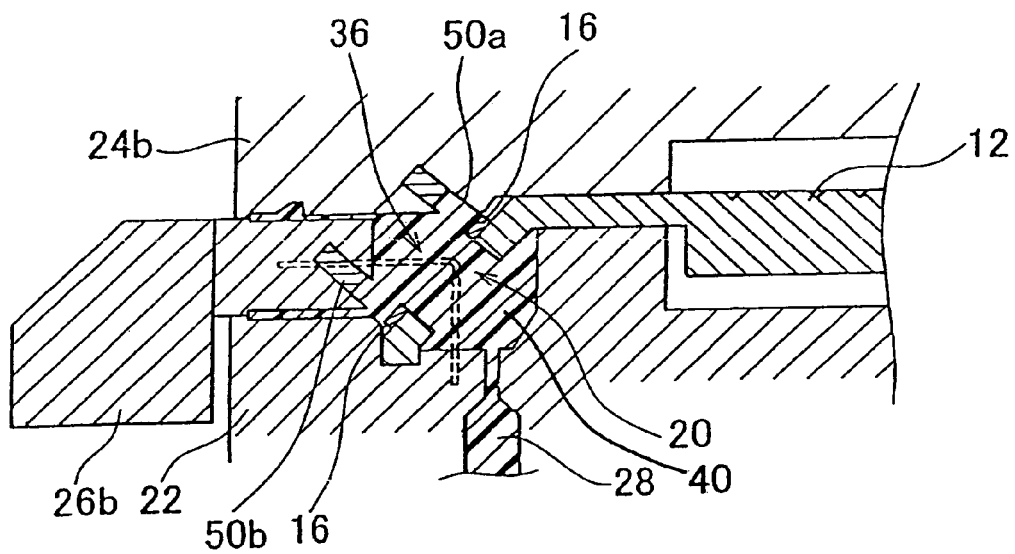
FIG. 10 is a view for explaining a step of the second embodiment, which corresponds to the step of the first embodiment shown in FIG. 7.

Next, a second embodiment of the present invention will be described with reference to FIGS. 9 and 10. FIG. 9 shows a closed mold in the second embodiment and corresponds to FIG. 6, which was referred to when making description on the molded article production method of the first embodiment. FIG. 10 illustrates the cavity of the mold when the resin is injected in the second embodiment and corresponds to FIG. 7, which was referred to when making description on the molded article production method of the first embodiment. In the second embodiment, the retainer 18 is not attached to the main body part 12. Thus, the main body part 12 of the condition as shown in FIG. 2 is disposed on the bottom mold 22 and, subsequently, the steps of the first embodiment illustrated in FIGS. 4 and 5 are carried out.

In accordance with the second embodiment, the top mold 24b includes a compression member 50a that can be moved within the cavity 36 in the thickness direction of the foam sealant 16, as can be seen in FIG. 9. Likewise, a slide mold 26b includes a compression member 50b that can be moved within the cavity 36 in the thickness direction of the foam sealant 16. The compression members 50a and 50b extend perpendicularly to the sealant attachment surface of the main body part 12. Referring to FIG. 9, after the mold is closed, the compression member 50a is extended toward the foam sealant 16, located above the opening 20 in the figure. The extended compression member 50a compresses the foam sealant 16 located above the opening 20. In a similar manner, the compression member 50b is extended toward the foam sealant 16 located below the opening 20 in the figure. The extended compression member 50b compresses the foam sealant 16 located below the opening 20. Under this condition, molten resin is injected through the resin injection passage 28.

Referring next to FIG. 10, the compression members 50a and 50b are retracted and separated from the foam sealant 16 before the injected resin solidifies. Since the injected resin 40 has not solidified, the empty spaces created by the retraction of the compression members 50a and 50b are filled with the resin 40 which is not solidified as yet. Subsequently, once the injected resin 40 is solidified, the mold is opened to remove the molded article in the same manner as set forth in the first embodiment with reference to FIG. 8.

According to the molded article production method of the second embodiment, the foam sealant 16 attached to around the opening 20 of the main body part 12 can be kept compressed in its thickness direction by means of the compression members 50a and 50b. This allows the foam sealant 16 to greatly improve air-tightness between the resin-made connector part 14 (see FIG. 8) and the main body part 12.

The compressed foam sealant 16 is also expanded into the empty space left after retraction of the compression members 50a and 50b. However, the expansion of the foam sealant 16 is minimal, because the pressurized molten resin 40 of high fluidity fills the empty space faster than the foam sealant 16 can expand into the same. Moreover, the pressure of the molten resin 40 that fills the empty space maintains the compression of the foam sealant 16. The foam sealant 16 continues to be compressed by the compression members 50a and 50b until the molten resin 40 is fully charged around the foam sealant 16. This makes it possible to keep the foam sealant 16 substantially uniformly compressed in the surface boundary at the time when the resin-made connector part 14 has been molded.

The compression members 50a and 50b are adapted to keep the foam sealant 16 compressed at the attached position until the injected molten resin fully arrives at the foam sealant 16 and its vicinities. This precludes the possibility that the molten resin is unevenly introduced to the side surfaces of the foam sealant 16 and thus the foam sealant 16 is dislocated from the originally attached position.

In the second embodiment, those portions of the foam sealant 16 respectively located above and below the opening 20 in the drawings are kept compressed by means of the compression members 50a and 50b. However, the positions in which the foam sealant 16 is compressed by the compression members 50a and 50b are not restricted to the ones above and below the opening 20 in the drawings. For instance, the foam sealant 16 may be compressed in the left position and the right position of the opening 20. The surface areas of the foam sealant 16 left out of contact with the compression members 50a and 50b are compressed by the pressure of the injected molten resin, as described later in respect of the third embodiment.

Third Embodiment

Next, a method of producing a molded article in accordance with a third embodiment of the present invention will be described. In the third embodiment the foam sealant 16 is compressed by the pressure of resin acting in the injection process of the molten resin. According to this method, the foam sealant 16 is attached to the external surface of the peripheral portion 21 around the opening 20 of the main body part 12, as shown in FIG. 2 and placed within the mold. Subsequent steps are the same as the steps described earlier in connection with FIGS. 4 through 8, except that the retainer 18 is not used. In the following, the third embodiment will be described with reference to FIGS. 4 through 8 on the premise that the retainer 18 is not attached to the main body part 12.

In the third embodiment, the top mold 24, the bottom mold 22, the slide mold 26 and a portion of the main body part 12 are combined to define the cavity 36 when the mold is closed as illustrated in FIG. 6. The main body part 12 is positioned within the mold in such a manner that the external surface of the foam sealant 16 attached to the peripheral portion around the opening 20 of the main body part 12 and the internal surface 19 of the peripheral portion 21 around the opening 20 of the main body part 12 are exposed inside the cavity 36.

Under this condition, the thermally molten resin is injected into the cavity 36 through the injection passage 28. FIG. 7 illustrates the state in which the cavity 36 is filled with the molten resin 40. The foam sealant 16 is heavily compressed by the pressure of the molten resin 40 injected through the injection passage 28. This condition is kept until the molten resin 40 has cooled and solidified. In the heavily compressed state, the foam sealant 16 provides a air-tight seal between the main body part 12 and the resin 40.

Once the resin has cooled and solidified, the top mold 24 is removed in the direction indicated by an arrow 42 in FIG. 8 and the slide mold 26 is moved to the left as indicated by an arrow 44 in that figure, thus opening the mold. This creates a connector case 10 in which the resin-made connector part (resin part) 14 is integrally molded to the opening 20 of the main body part 12.

The molten resin 40 filled in the cavity 36 shrinks as it cools and (becomes) solidified, forming the resin-made connector part 14 illustrated in FIG. 8. Even if such shrinkage of the molten resin 40 creates a gap between the main body part 12 and the connector part 14, the foam sealant 16 fills up the gap as it expands from the compressed condition.

The foam sealant 16 attached to the main body part 12 prior to the resin injection has isolated or semi-isolated pores in the interior thereof, allowing deformation to be carried out at a low compression load. In accordance with the molded article production method of the third embodiment, if the molten resin 40 is injected into the cavity 36 of the mold as shown in FIG. 7, the foam sealant 16 deformable at a low compression load is heavily compressed by the pressure of the injected molten resin 40. Thus, even if the injected resin 40 shrinks during it's cooling process, the heavily compressed foam sealant 16 expands to fill any gapes that form between resin 40 and the main body part 12 due to the shrinking of the resin 40. Seeing that the foam sealant 16 remains sufficiently compressed prior to the solidification of the resin 40, it exhibits a compression ratio of at least about 5% even after the foam sealant 16 expands and fills in the afore-mentioned gap. Filling the foam sealant 16 with a compression ratio of at least about 5% in between the resin part and the main body part ensures the air-tightness at the surface boundary.

In the third embodiment, the foam sealant 16 is attached to the surface around the opening 20 of the main body part 12. Furthermore, the main body part 12 is positioned within the mold in such a manner that the foam sealant 16 and the internal surface (designated by the reference numeral 19 in FIG. 3) of the peripheral portion 21 around the opening 20 of the main body part 12 are exposed inside the cavity 36. The molten resin 40 flowing through the opening 20 is filled into the cavity on the external surface side of the foam sealant 16 and the cavity on the internal surface side of the main body part 12. The resin part 14 thus injection-molded extends through the opening 20 and comes into a pressure-contact with the external surface of the foam sealant 16 and the internal surface of the main body part 12, thus keeping the foam sealant 16 in a compressed condition.

In accordance with the molded article production method of the third embodiment, the air-tightness is secured between the resin-made connector part 14 and the main body part 12 even if the resin shrinks during cooling. In other words, by merely injection-molding the resin, it is possible to produce a connector case (molded article) 10 having the required air-tightness between the resin-made connector part 14 and the main body part 12. There is no need to perform an additional step to ensure the air-tightness between the connector part 14 and the main body part 12, after the resin has been injection-molded.

In the molded article production method of the third embodiment, it is preferred that, as already set forth in connection with the first embodiment, at least a part of the circumference of the foam sealant attached is kept compressed by use of a retainer. This helps to prevent the foam sealant from being dislocated on the sealant attachment surface at the time when the foam sealant is compressed by the pressure of the molten resin.

Furthermore, In the molded article production method of the third embodiment, it is preferred that, as previously set forth in connection with the second embodiment, at least a part of the circumference of the foam sealant attached is kept compressed by compression members provided in the mold. This helps to prevent the foam sealant from being dislocated on the sealant attachment surface at the time when the foam sealant gets compressed by the pressure of the molten resin.

Modified Embodiments

Next, descriptions will be made regarding a number of modified embodiments for the foregoing embodiments.

First Modified Embodiment

Figure 11:
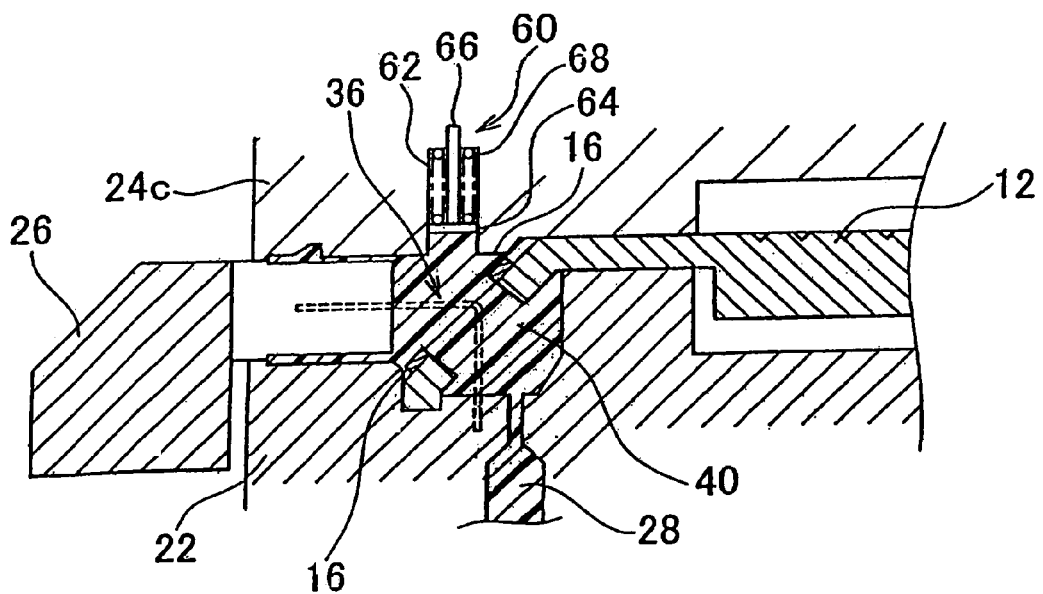
FIG. 11 is a view for explaining a first modified embodiment of the preferred embodiments.

A first modified embodiment will be first set forth with reference to FIG. 11 which shows a step of the first modified embodiment corresponding to the step of the first embodiment illustrated in FIG. 7. In the first modified embodiment, the top mold 24c is provided with a pressure-measuring unit 60 for measuring the pressure of the molten resin 40 injected into the cavity 36. The pressure measuring unit 60 includes a cylinder 62 communicating with the cavity 36, a piston 64 slidable with respect to the cylinder 62, a piston rod 66 fixedly secured to the piston 64 and a resilient member 68 for biasing the piston 64 toward the cavity 36.

When the molten resin 40 is injected through the resin injection passage 28, the pressure of the molten resin 40 raised the piston 64. Because the piston 64 is kept biased toward the cavity 36 by means of the resilient member 68, the piston 64 is moved upwardly into a position where the pressure of the molten resin 40 in the cavity 36 is balanced with the biasing force of the resilient member 68 applied to the piston 64. This means that the pressure of the molten resin 40 in the cavity 36 can be found by measuring the upward displacement of the piston rod 66 fixedly secured to the piston 64. The molten resin 40 is injected through the injection passage 28 at a predetermined pressure. Thus, measuring the pressure in the cavity 36 by use of the pressure measuring unit 60 makes it possible to determine whether or not the foam sealant 16 is in a normal condition. For example, in case where the foam sealant 16 gets peeled off from the main body part 12 and is deformed into an abnormal shape, the pressure value in the cavity 36 measured by the pressure measuring unit 60 differs from a typical pressure value. Accordingly, the presence of the pressure measuring unit 60 makes it possible to detect that the easy-to-deform foam sealant 16 is in an abnormal condition. If the foam sealant 16 gets trapped in the surface boundary between the resin part 14 and the main body part 12, it cannot be judged by appearances whether or not the foam sealant 16 has been compressed in a proper manner. According to the first modified embodiment, the proper compression of the foam sealant 16 can be determined by use of the pressure measuring unit 60. This makes it possible to efficiently control the quality of the molded article produced through the use of the foam sealant 16 and having the resin part 14 integrally molded with the main body part 12.

Second Modified Embodiment

Figure 12A:
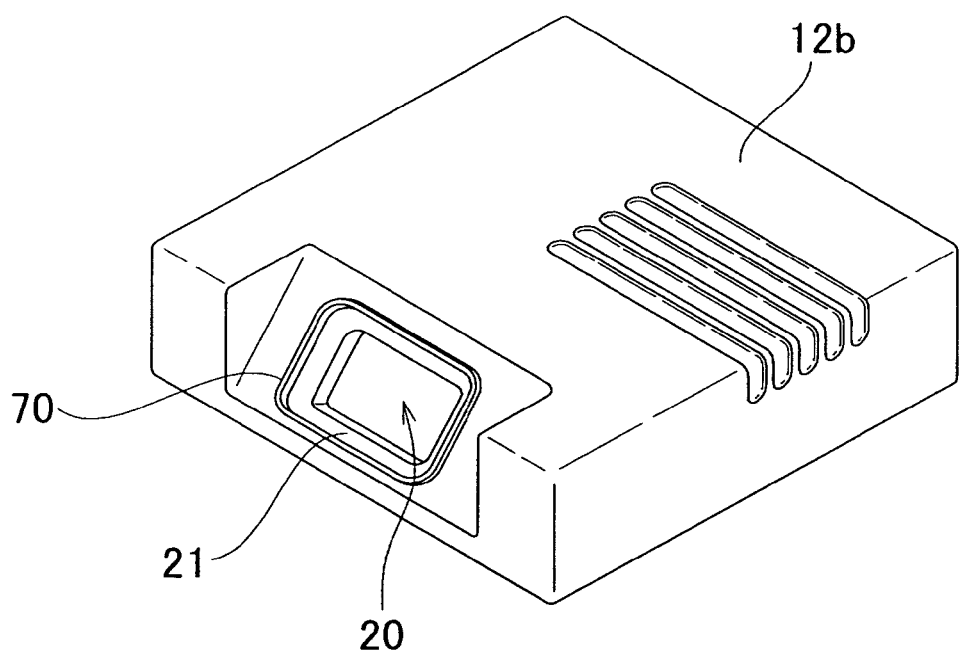
FIG. 12A is a schematic perspective view showing a main body part employed in a second modified embodiment of the preferred embodiments.

A molded article production method of a second modified embodiment will now be described with reference to FIGS. 12A, 12B, 12C and 12D. FIG. 12A is a schematic perspective view showing a main body part 12b employed in the second modified embodiment, FIG. 12B is a view illustrating the state in which a foam sealant 16 is attached to the main body part 12b, FIG. 12C is a schematic perspective view showing a connector case 10b to which a connector part 14 has been molded, and FIG. 12D is an enlarged vertical cross-sectional view of the connector case 10b taken along line 12D-12D in FIG. 12C to illustrate the surroundings of an opening 20.

The main body part 12b of the second modified embodiment is provided with a raised rim portion 70 around the opening 20 thereof. In the second modified embodiment, the connector case 10b is produced by integrally molding the resin-made connector part 14 to the main body part 12b having the raised rim portion 70. As can be seen in FIG. 12A, the area 21 lying inside the raised rim portion 70 of the main body part 12b serves as a target surface to which the foam sealant 16 is to be attached.

Figure 12B:
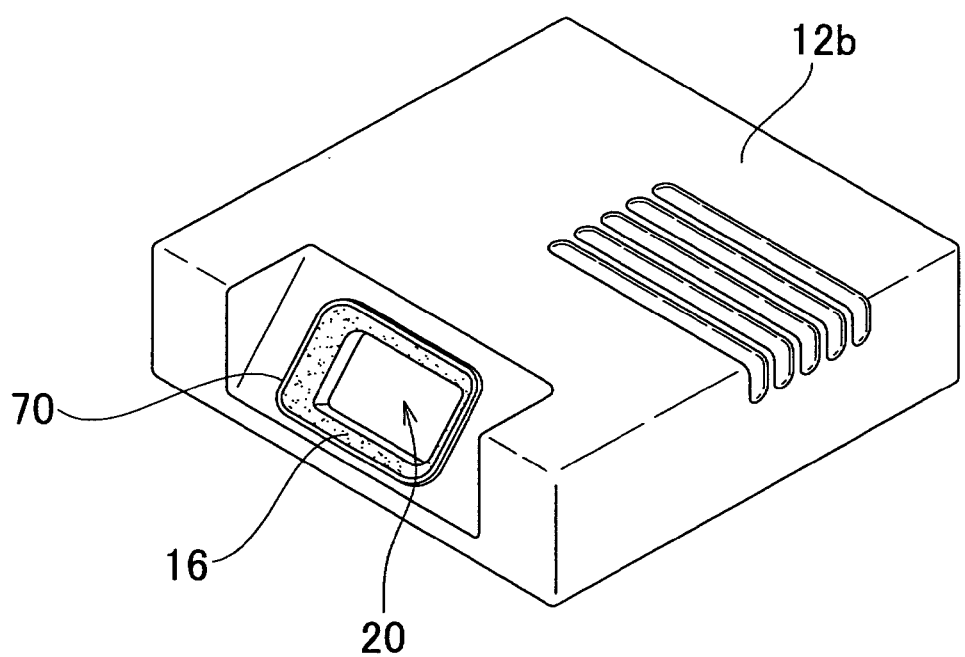
FIG. 12B is a view illustrating a state in which a foam sealant is attached to the main body part of the second modified embodiment.
Figure 12C:
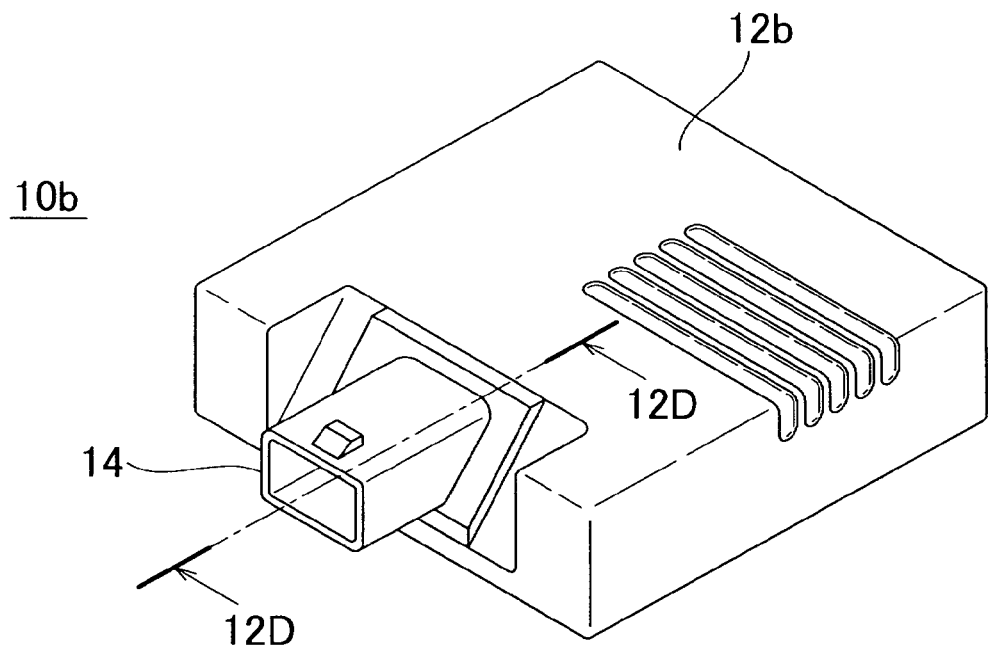
FIG. 12C is a schematic perspective view showing a connector case produced in accordance with the second modified embodiment.

Referring to FIG. 12B, the foam sealant 16 is attached to the target surface along the raised rim portion 70 provided around the opening 20 of the main body part 12b.

Figure 12D:
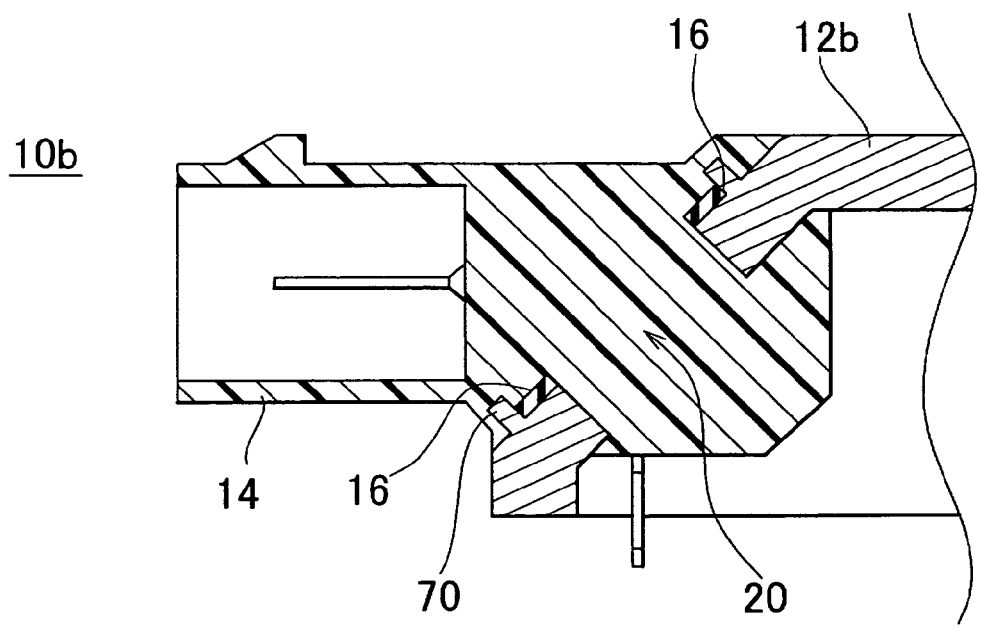
FIG. 12D is an enlarged vertical cross-sectional view taken along line 12D-12D in FIG. 12C to illustrate the surroundings of an opening.

As illustrated in FIG. 12D, the opening 20 of the main body part 12b is closed by means of the resin-made connector part 14 integrally molded with the main body part 12b. The foam sealant 16 extends along the raised rim portion 70 provided around the opening 20 and remains sealingly compressed in between the main body part 12b and the connector part 14. Keeping the foam sealant 16 in such a sealingly compressed condition ensures the air-tightness between the main body part 12b and the connector part 14. Other details of the method for producing the connector case 10b in this modified embodiment are substantially the same as fully set forth in respect of the methods of the first through third embodiments.

According to the second modified embodiment, the foam sealant 16 is attached to the target surface along the raised rim portion 70 provided around the opening 20 of the main body part 12b. The raised rim portion 70 can prevent the foam sealant 16 from being dislocated off its attachment surface when the resin is injected. This makes it possible to efficiently compress the foam sealant 16 in its thickness direction with no likelihood of dislocation on its attachment surface. In this modified embodiment, the foam sealant 16 may be attached in such a manner as to go over the raised rim portion 70.

Third Modified Embodiment

Figure 13A:
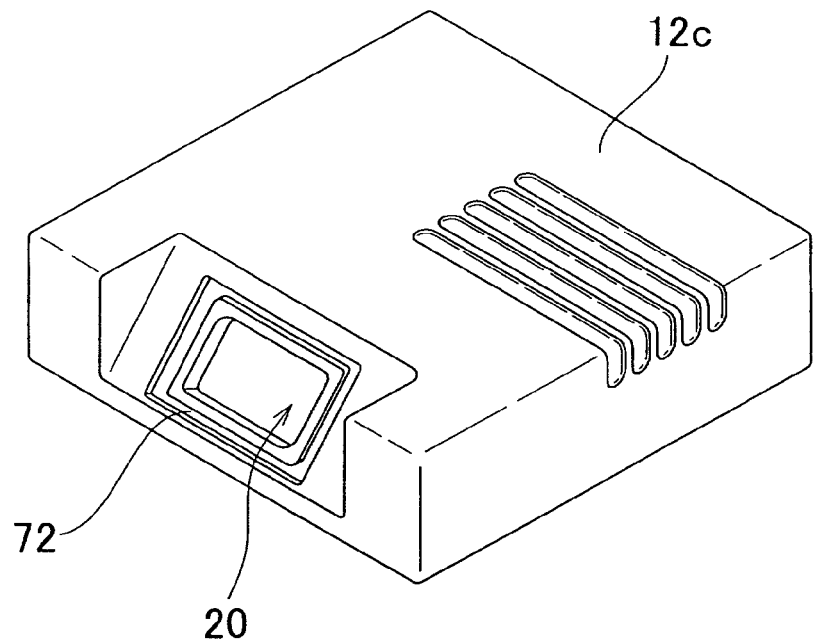
FIG. 13A is a schematic perspective view showing a main body part employed in a third modified embodiment of the preferred embodiments.
Figure 13B:
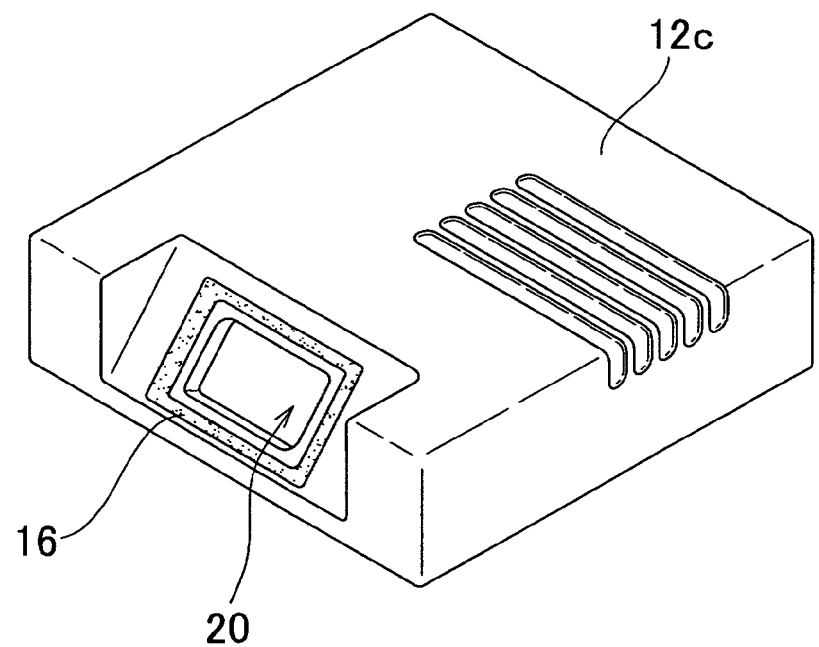
FIG. 13B is a view illustrating a state in which a foam sealant is attached to the main body part of the third modified embodiment.
Figure 13C:
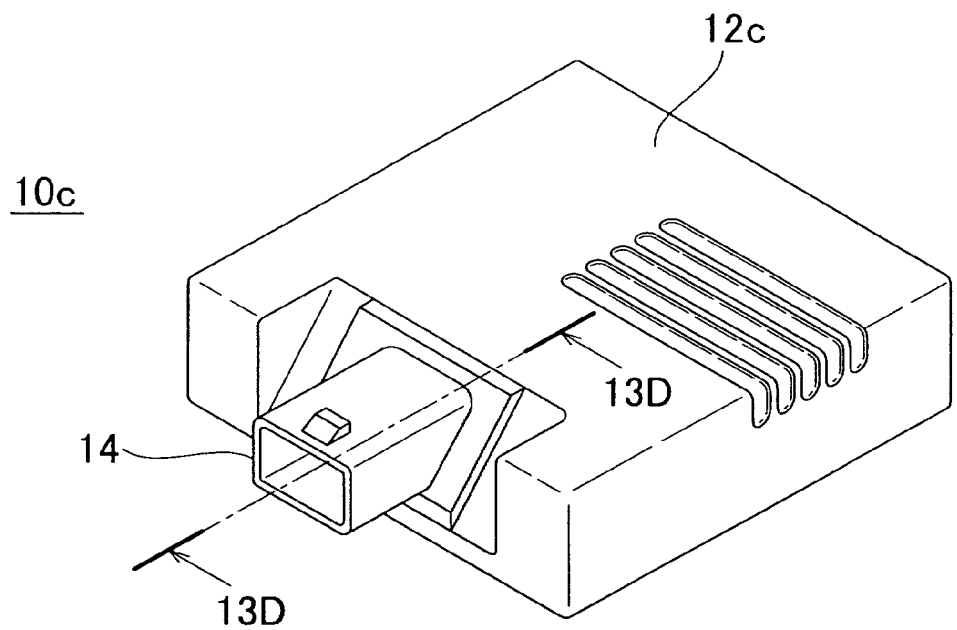
FIG. 13C is a schematic perspective view showing a connector case produced in accordance with the third modified embodiment.

A molded article production method of a third modified embodiment will now be described with reference to FIGS. 13A, 13B, 13C and 13D. FIG. 13A is a schematic perspective view showing a main body part 12c employed in the third modified embodiment, FIG. 13B is a view illustrating the state in which a foam sealant 16 is attached to the main body part 12c, FIG. 13C is a schematic perspective view showing a connector case 10c to which a connector part 14 has been molded, and FIG. 13D is an enlarged vertical cross-sectional view of the connector case 10c taken along line 13D-13D in FIG. 13C to illustrate the surroundings of an opening 20.

Referring to FIG. 13A, the main body part 12c of the third modified embodiment is provided with a groove portion 72 around the opening 20 thereof. In the third modified embodiment, the connector case 10c is produced by integrally molding the resin-made connector part 14 to the main body part 12c having the groove portion 72. As can be seen in FIG. 13B, the foam sealant 16 is attached to the bottom surface of the groove portion 72 of the main body part 12b.

Figure 13D:
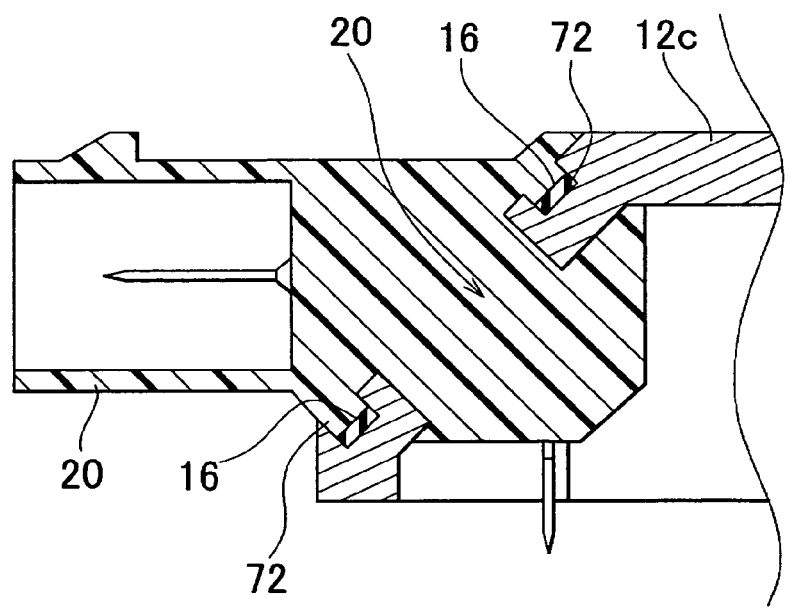
FIG. 13D is an enlarged vertical cross-sectional view taken along line 13D-13D in FIG. 13C to illustrate the surroundings of an opening.

As illustrated in FIG. 13D, the opening 20 of the main body part 12c is closed up by means of the resin-made connector part 14 integrally molded with the main body part 12c. The foam sealant 16 extends along the groove portion 72 provided around the opening 20 and remains sealingly compressed in between the main body part 12c and the connector part 14. Keeping the foam sealant 16 in such a sealingly compressed condition ensures the air-tightness between the main body part 12c and the connector part 14. Other details of the method for producing the connector case 10c in this modified embodiment are substantially the same as fully set forth in respect of the methods of the first through third embodiments.

According to the third modified embodiment, the foam sealant 16 is attached to the bottom surface of the groove portion 72 provided around the opening 20 of the main body part 12c. Attaching the foam sealant 16 on the bottom surface of the groove portion 72 can prevent the foam sealant 16 from being dislocated on its attachment surface when the resin is injected. This makes it possible to efficiently compress the foam sealant 16 in its thickness direction and reduces the likelihood of dislocation on its attachment surface. In this modified embodiment, the groove portion 72 may have a cross-section of rectangular or sector-like shape. Moreover, the foam sealant 16 may be partially disposed in the groove portion 72.

In the embodiments and modified embodiments set forth above, a liquid or powdery sealant containing an expandable substance can also be used as the foam sealant of the present invention, in place of the aforementioned foam sealant. In this case, each of the molded article production methods may instead incorporate a step of applying the liquid or powdery sealant containing an expandable substance on the peripheral portion around the opening of the main body part and a step of foaming the expandable substance contained in the sealant thus applied. Except for these steps, the resin part is injection-molded to the main body part using the same steps as described above in connection with the embodiments and modified embodiments. This also makes it possible to produce a molded article that provides an excellent air-tightness between the resin part and the main body part.

In particular, the step of applying the liquid or powdery sealant containing an expandable substance is suitable for machine-based automation. Thus, a molded article ensuring excellent air-tightness between the resin part and the main body part can be produced by means of an automated production method.

In the embodiments and modified embodiments set forth above, the foam sealant preferably has a compression ratio that is at least equal to or greater than 5% when the injected resin solidifies. If the foam sealant 16 is kept compressed at least 5% or more at the surface boundary between the resin part and the main body part, the required level of air-tightness can be easily maintained.

In the embodiments and modified embodiments set forth above, it is preferred that the foam sealant has a compression ratio of about 90% at the time when the injected resin is not in a solid state. The reason for keeping the compression ratio of the foam sealant equal to about 90% prior to the solidification of the injected resin is that the post-resin-solidification compression ratio of the foam sealant becomes at least 5% or more, thus maintaining the air-tightness in the surface boundary, even when the compressed foam sealant expands and fills up into the gap created by the solidification and shrinkage of the resin.

In the first and second embodiments described above, the foam sealant is attached to the external surface around the opening of the main body part. Alternatively, the foam sealant may be attached to the inner circumference of the opening 20. Furthermore, the form sealant may be attached to the internal surface around the opening of the main body part.

The molded articles produced using the above-described production methods include a resin part that is injection-molded into an opening of the main body part. A foam sealant is attached to the peripheral surface of the opening of the main body part. The injection-molded resin part extends through the opening and makes contact, at its outer body side, with a surface of the foam sealant and, at its inner body side, with the internal surface 19 of the main body part 12, thus compressing the foam sealant in the thickness direction at a compression ratio of 5%-90%. In this regard, additional foam sealant may be attached to the internal surface of the peripheral portion around the opening 20 of the main body part 12, allowing the resin part 14 to come into a contact at its inner body side with the internal surface of the main body part through the additional foam sealant.

In the molded articles described above, the foam sealant compressed at a compression ratio of 5%-90% is inserted between the main body part and the resin part, thereby ensuring the air-tightness at the surface boundary of the main body part 12 and the resin part 14. The injection-molded resin part 14 extends through the opening 20 to make pressure-contact with the external surface of the foam sealant and, at the same time, with the internal surface of the main body part. In other words, the foam sealant is compressed at its internal and external surfaces by the resin part and therefore can be kept compressed for an extended period of time.

In addition to the above, the present invention provides the following advantageous effects, which are attributable to the attachment of the foam sealant to the main body part before injection-molding a resin part:

(1) The foam sealant has a surface irregularity and therefore can provide an enhanced attachability with the injected resin;

(2) The foam sealant has an excellent compressibility and therefore has no tendency to push away the injected resin, making sure that the molten resin is sufficiently widely spread up to the resin attachment surface of the main body part; and (3) The foam sealant is highly flexible and therefore can be easily attached to the main body part however complex the contour around the opening of the main body part may be.

The invention has been shown and described in the context of a number of specific embodiments for the illustrative purpose only and is not intended to limit the scope of the invention. It will be understood by those skilled in the art that various changes and modifications thereto may be made without departing from the scope of the invention as defined in the following claims.

In the embodiments described above, a metallic connector case is used as an example of the main body part for the molded article in which a resin part is injection-molded to the main body part. However, the molded article to which the present invention relates is not confined to a connector case. Furthermore, the material of which the main body part is made is not restricted to metal but may include, for example, a resin material that has a higher melting point than that of the injection-molded resin part.

The technical elements or features described in this specification or illustrated in the accompanying drawings present technical utility either independently or in combination. Accordingly, the combination recited in the claims at the time of filing the subject application should not be construed to limit the scope of the invention. Moreover, the technical elements or features described in this specification or illustrated in the accompanying drawings are capable of concurrently accomplishing plural objects. However, they have a technical utility by fulfilling one of the plural objects.

What is claimed is:

1. A method for producing a molded article in which a resin part is injection-molded to an opening of a main body part, the method comprising the steps of:
    attaching a foam sealant substantially entirely within a grooved portion provided around the opening of the main body part to define an air-tight seal between the main body part and the resin part, wherein the foam sealant has a plurality of isolated pores and has no air permeability;
    combining the main body part with a mold to form a cavity in which the foam sealant, attached to the main body part, and an internal surface of a peripheral portion around the opening of the main body part are exposed inside the cavity;
    injecting a molten resin into the cavity and
    compressing the foam sealant to the main body part by a pressure of the injected molten resin.

2. The method of claim 1, wherein the step of attaching the foam sealant further comprises:
    applying to the grooved portion provided around the opening of the main body part a liquid or powdery sealant containing an expandable substance; and
    foaming the expandable substance to create the foam sealant.

3. The method of claim 1, wherein said pressure of the injected molten resin is a first pressure, and wherein the method further comprises:
    compressing the foam sealant to the main body part partially by a second pressure, wherein a source of the second pressure differs from a source of the first pressure.

4. The method of claim 3, wherein the second pressure partially compressing the sealant is applied by a retainer attached to the main body part.

5. The method of claim 4, wherein the retainer is made of the same resin as the injected resin.

6. The method of claim 3, wherein the second pressure partially compressing the sealant is applied by a compression member that is movable with respect to the mold.

* * * * *